United States Patent [19]

van der Pol

[11] Patent Number: 5,799,534

[45] Date of Patent: Sep. 1, 1998

[54] PROCEDURE FOR MEASURING THE LEVEL OF A LIQUID IN A TANK ACCORDING TO THE RADAR PRINCIPLE

[75] Inventor: Ronald van der Pol, Venlo, Netherlands

[73] Assignee: Krohne Messtechnik GmbH & Co. KG, Germany

[21] Appl. No.: 703,225

[22] Filed: Aug. 26, 1996

[30] Foreign Application Priority Data

Aug. 25, 1995 [DE] Germany ............... 195 31 540.5

[51] Int. Cl.⁶ .................................................. G01F 23/00
[52] U.S. Cl. ...................................................... 73/290 V
[58] Field of Search ................... 73/290 V, 290 R; 342/124; 340/612

[56] References Cited

U.S. PATENT DOCUMENTS

| | | | |
|---|---|---|---|
| 4,503,433 | 3/1985 | Tomasi | 342/124 |
| 4,847,623 | 7/1989 | Jean et al. | 342/124 |
| 5,365,178 | 11/1994 | Van Der Pol | 342/124 |
| 5,406,842 | 4/1995 | Locke | 73/290 R |
| 5,438,867 | 8/1995 | Van Der Pol | 73/290 V |

*Primary Examiner*—George Dombroske
*Assistant Examiner*—Harshad Patel
*Attorney, Agent, or Firm*—Cesari and McKenna, LLP

[57] ABSTRACT

A process for measuring the level of a liquid in a tank according to the radar principle, using a voltage-controlled oscillator determining the radar frequency, and a voltage source controlling the voltage-controlled oscillator, in the case of which the radar frequencies are modulated according to the FMCW process by a corresponding control of the voltage source. The frequency of the voltage-controlled oscillator is measured at least regularly during the frequency sweep, and a non-linear frequency characteristic is corrected during the frequency sweep through a corresponding controlling of the voltage source.

10 Claims, 3 Drawing Sheets

PROCEDURE FOR MEASURING THE LEVEL OF A LIQUID IN A TANK ACCORDING TO THE RADAR PRINCIPLE

The invention concerns a process for measuring the level of a liquid in a tank according to the radar principle, by means of a voltage-controlled oscillator determining the radar frequency and by means of a voltage source controlling the voltage-controlled oscillator, in the case of which the radar frequencies are modulated by means of a corresponding control of the voltage source according to the FMCW process.

BACKGROUND OF THE INVENTION

The known processes, upon which the invention is based, are known from the prior art in a number of modifications. An essential problem of these known processes is the deviation of the actual frequency characteristic during a frequency sweep, provided in accordance with the FMCW process, from the predetermined frequency characteristic. Such non-linear frequency characteristics during a frequency sweep result in uncertainties in the measurement of the level of a liquid in a tank.

Different measures for solving the problem described are known from the prior art. Since a non-linear frequency characteristic during the frequency sweep in the case of different levels can lead to different errors in the measurement for the level, a reference reflector, respectively a fixed reference cable, which does not ensure the presence of a reference reflex of the radar waves does not suffice to eliminate the described influence on the measurement accuracy of the process. In order to provide the desired measurement accuracy in the mm range, but at least in the cm range, it is necessary to arrange a number of reference reflectors over the level of the tank. However, such a procedure is both relatively expensive with respect to equipment and with respect to the process. A further measure for solving the problem described, known from the prior art, consists in using a digital-to-analog converter as a voltage source for controlling the voltage-controlled oscillator. In the case of the known process, this digital-to-analog converter is controlled by a microprocessor in such a way that the non-linearity of the voltage-controlled oscillator is compensated by the voltage characteristic given by the digital-to-analog converter. The basis of the control of the voltage-controlled oscillator through the digital-to-analog converter by means of the microprocessor in the case of the known process is the voltage/frequency characteristic of the voltage-controlled oscillator, which is determined under the static conditions, that is, in the case of voltages, from the frequencies produced in each case applied over a certain period of time. However, even with these known measures the level measurement accuracy required for industrial applications is not achieved.

SUMMARY OF THE INVENTION

Thus, the inventions is based on the task of designing and restructuring the known process for measuring the level of a liquid in a tank according to the radar principle in such a way that the level measurement accuracy is clearly increased.

In accordance with the invention the task indicated and presented above is solved by the fact that the frequency of the voltage-controlled oscillator is measured at least regularly during the frequency sweep and that a non-linear frequency characteristic during the frequency sweep is corrected by a corresponding control of the voltage source.

By means of the configuration of the process in accordance with the invention, it is assured that the frequency characteristic during the frequency sweep has an optimal linearity in each case. This linearity is neither influenced by temperature influences or other environmental conditions nor by aging processes since it, in contrast to the known process which is based on a correction by means of the voltage/frequency characteristic of the voltage-controlled oscillator recorded exclusively under static conditions, is continuously checked and corrected. The measures in accordance with the invention ensure that the measurement accuracy's required in the industrial range are reached in the mm range, respectively cm range. Under certain circumstances a regular measurement of the frequency characteristic at every n-th frequency sweep is sufficient for correction here.

If now the correction of a frequency characteristic of a frequency sweep in accordance with the invention is made by means of the measured frequencies of the current frequency sweep, this measure also ensures the correction of entirely short-term influences on the linearity of the frequency behavior during the frequency sweep.

Since now on the basis of the final processing speed for the measurement results with respect to the frequency of the voltage-controlled oscillator, a dead time between the determination of the deviation of the actual frequency characteristic from the given linear frequency characteristic and the correction, it is advantageous to increase the duration of the frequency sweep and thus to reduce the time variation of the frequencies and to improve the correction. This is ensured by having the duration of the frequency sweep chosen in an interval inversely proportional to the time variation of the level. The variation of the level over time has to be taken into account since, in the case of too great an extension of the duration of the frequency sweep with simultaneous variation of the level, an exact determination of the level no longer is possible. Therefore if the level rises or falls relatively quickly, the duration of the frequency sweep has to be reduced in order to ensure a sufficient measurement accuracy, simultaneously permitting the correction of the frequency characteristic by means of the measured frequencies of the current frequency sweep on the basis of the explained dead time. The interval provided ensures that the duration of the frequency sweep does not go over or under specified appropriate limits.

Since thus in the case of large time variations of the level, e.g. in the case of rapid filling, the measurement accuracy for the level of the liquid in the tank suffers increasingly, it is helpful that if there are great variations of the level over time, a status signal indicating these changes then is generated. A central control unit, which in the industrial process observes the level of a liquid in a tank by means of the process in accordance with the invention, obtains the information that the measurement accuracy for the level is relatively small at the moment, which, for example, this central control unit can evaluate without not drawing upon measurement values received at the time of the application of the mentioned status signal for further calculations.

An alternative for the direct correction of the frequency characteristic of a frequency sweep by means of the measured frequencies of the current frequency sweep consists in the he fact that the correction of the frequency characteristic of a frequency sweep is performed by means of the measured frequencies of a frequency characteristic or also in the case of several averaged frequency characteristics of a previous frequency sweep. In the case of this alternative of the process in accordance with the invention, very short-term influences on the linearity of the frequency characteristic are not taken into account during a frequency sweep, whereas medium-term to long-term influences are corrected very effectively. The described alternative of the process in accordance with the invention also makes it possible to have a very short duration of the frequency sweep, since the dead time arising as a result of the processing of the measurement values for the frequencies as a rule is clearly shorter than the time intervals between two sequential frequency sweeps. Consequently, here also it is not necessary to choose the duration of the frequency sweep depending on the time variation of the level.

In order to reduce the short-term influences on the linearity of the frequency characteristic during the frequency sweep as much as possible, it is advantageous that the duration of the frequency sweep and the time intervals between the frequency sweeps be kept constant. This stabilizes the conditions for the operation of the electrical and electronic components involved, so that no short-term influences influence the linearity of the frequency characteristic during a frequency sweep, at least from these electrical components themselves.

A combination of the alternatives described, so that the correction of the frequency characteristic of a frequency sweep is carried out by means of the measured frequency of the current frequency sweep and the measured frequencies of a frequency characteristic or several averaged frequency characteristics, essentially stipulates the advantages of the two alternative configurations of the process in accordance with the invention described up to now at the expense of using a complex evaluation algorithm.

The configurations of the process in accordance with the invention described up to now are all redesigned advantageously so that a control algorithms used for the correction of the frequency characteristic of the frequency sweep. What control algorithm can be used in the respective case results from the known properties of control algorithms, for example, with respect to speed and accuracy.

Since the frequencies in the radar range frequently are very high, it is advantageous if the frequencies of the voltage-controlled oscillator are mixed in a mixer or divided in a divider before the measurement. This measure ensures that the frequency characteristic of the voltage-controlled oscillator is measurable by means of the signal with low frequency by means of less expensive electronics. This measure usually is exercised in the cases in which the radar frequency is derived from the frequency of the voltage-controlled oscillator only via a frequency multiplier.

The measurement of the frequencies of the voltage-controlled oscillator further can be used advantageously in such a way that the frequency fluctuation of the frequencies during a frequency sweep is controlled by means of the measured frequencies. The measurement accuracy for the level of a liquid in a tank also is increased further by this measure.

In particular, there are now a number of possibilities for designing and restructuring the invented process for measuring the level of a liquid in a tank according to the radar principle. Reference is made here, on the one hand, to the dependent patent claims and on the other hand to the description of a preferred specific embodiment in connection with the drawing.

BRIEF DESCRIPTION OF THE DRAWINGS IN THE DRAWINGS

FIG. 1 shows a specific embodiment of a device, located in a tank, for carrying out the process in accordance with the invention, FIG. 2 is a schematic representation of the functionally necessary components of the specific embodiment of a device, located in a tank, for carrying out the process in accordance with the invention, and FIGS. 3a) to 3c) are waveforms showing various operating characteristics of the apparatus for carrying out the process according to the invention.

DESCRIPTION OF THE PREFERRED EMBODIMENTS

Figure 1:
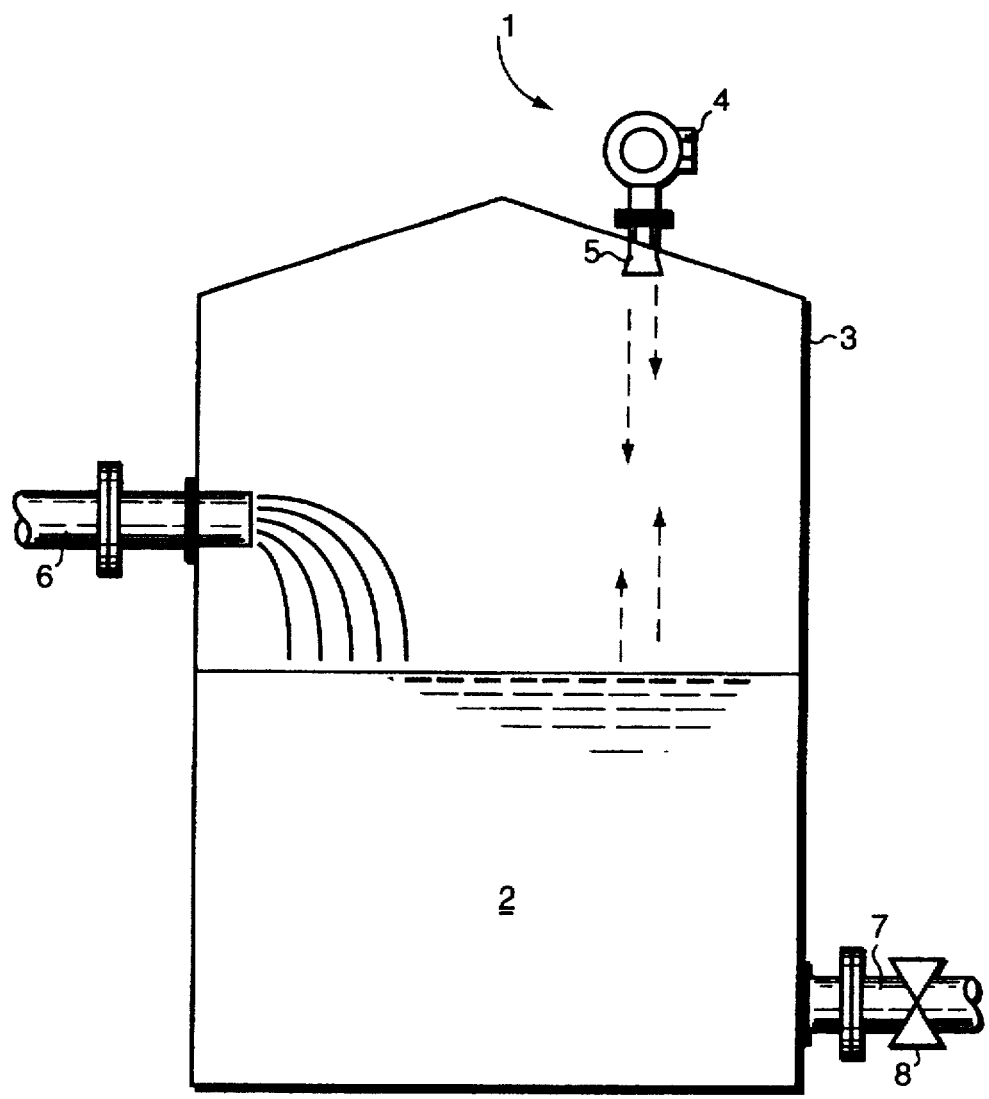

FIG. 1 shows a specific embodiment of a device 1 for carrying out a process for measuring the level of a liquid 2 in a tank 3, which operates according to the radar principle, in accordance with the invention. The device 1 has a control unit 4 and a sending, respectively receiving antenna 5 for the radar waves beamed in the direction of the surface of the liquid 2, respectively reflected from it. Further, FIG. 1 shows the inlet 6 and the outlet 7 of the tank 3. Finally, for example FIG. 1 shows a controllable valve 8 at the outlet 7 of the tank 3 only schematically.

Figure 2:
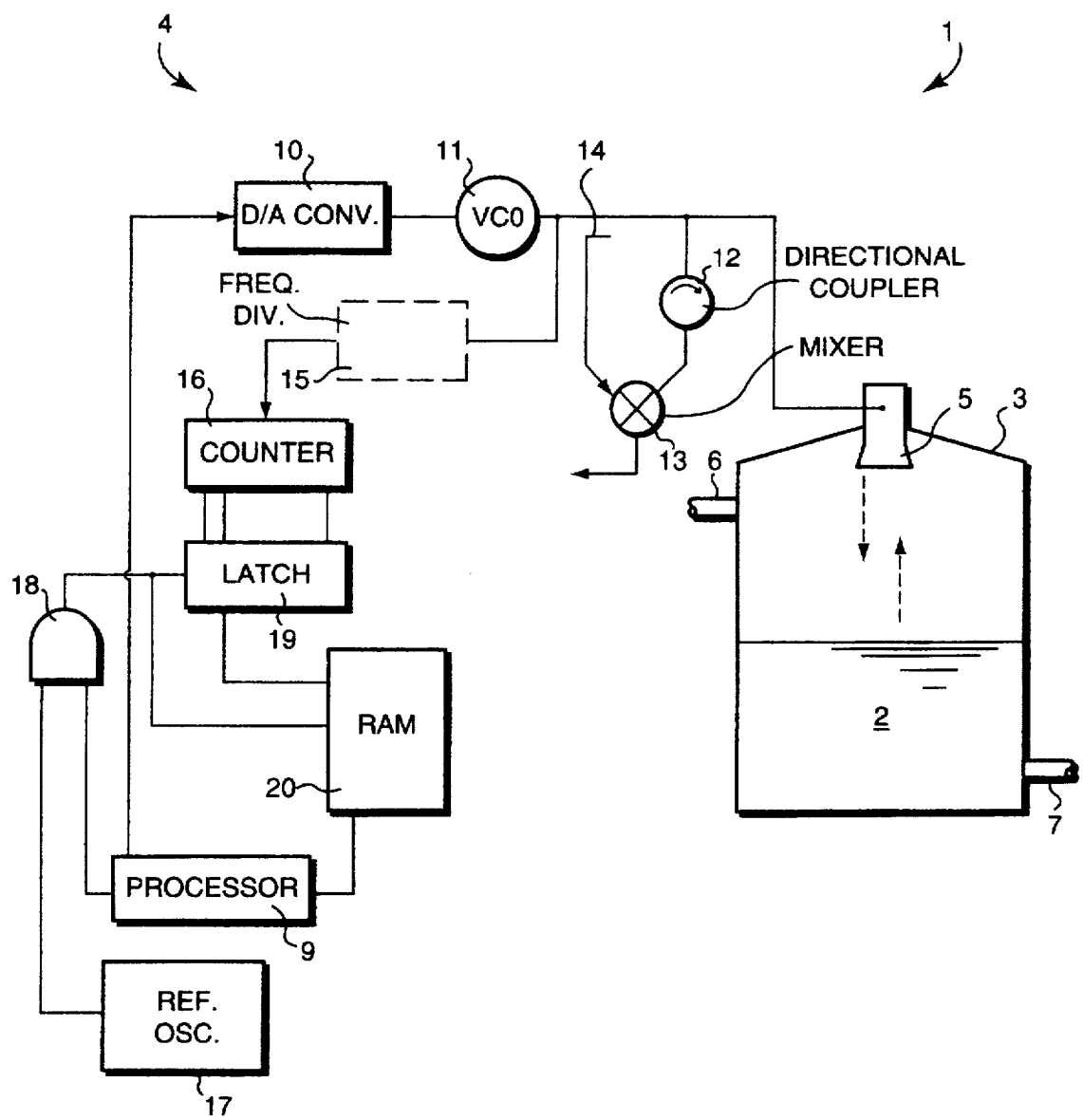

Next, as in FIG. 1, FIG. 2 shows the tank 3 with the inlet 6 and outlet 7 and the liquid 2 located in the tank. Further, the device 1 for carrying out the process in accordance with the invention is shown schematically divided into its functionally necessary parts. The control unit 4 shown in detail in FIG. 2 then has a microprocessor 9, which controls a voltage-controlled oscillator 11 via a digital-to-analog converter 10. This voltage-controlled oscillator 11 generates a modulated high-frequency signal according to the FMCW process, which is connected to the sending, respectively receiving antenna 5, beamed into the tank 3, reflected from the he surface of the liquid 2, again received by the sending, respectively receiving antenna 5, and fed to a mixer 13 via directional coupler 12. By means of the modulated high frequency signal decoupled via a coupler 14, this mixer 13 generates an intermediate frequency which is evaluated further by the control unit 4 for determining the running time of the radar signal. This evaluation is known in and of itself and will not be explained further here.

The modulated high frequency signal at the output of the voltage-controlled oscillator 11 in the specific embodiment shown first is fed to a frequency divider 15 for measurement of the frequency characteristic. As an alternative to the frequency divider 15 for measurement of the frequency characteristic. As an alternative to the frequency divider 15 shown in FIG. 2, a second mixer also can be used, by means of which the modulated high frequency signal at the output of the voltage-controlled oscillator 11 is mixed with a high frequency signal, for example of a dielectric resonance oscillator, in such a way that a frequency signal of clearly lower frequency, agreeing with the high frequency signal in the modulation is present at the output of the mixer.

In the case of the specific embodiment shown in FIG. 2, the divided modulated high-frequency signal is fed to a counter 16, which counts the periods of the frequency signal. The status of the counter 16 is read and stored via latch 19 controlled by gate 18 in a dual-port RAM 20 at intervals controlled by a reference oscillator 17 in connection with the microprocessor 9 and the gate 18. In parallel with storage in the dual port RAM 20, the counter statuses can be read at the same time by the microprocessor 9 from the dual port RAM 20 so that it is ensured that the correction of the frequency characteristic of a frequency sweep then can be made by means of the measured frequencies of the current frequency sweep. The correction of a non-linear frequency characteristic is made during a frequency sweep in the specific embodiment shown by having the microprocessor 9 control the digital-to-analog converter 10 and thus the voltage-controlled oscillator 11 controlled by means of the measurement results for the frequencies in such a way that a linear frequency characteristic of the frequency sweep is created.

Figures 3A, 3B, 3C:
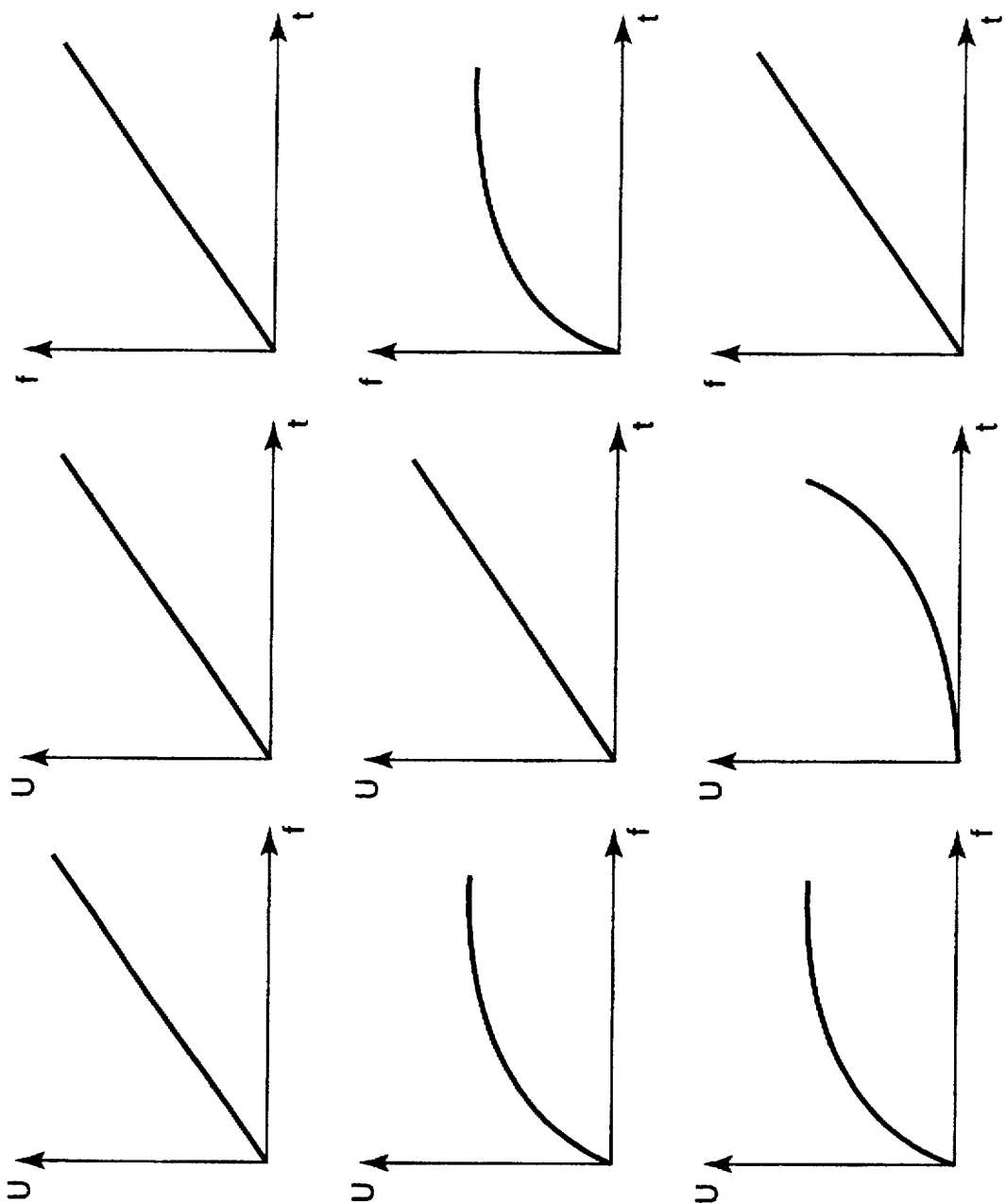

FIG. 3a) shows the voltage/frequency diagram of a voltage-controlled oscillator for is an ideal behavior on the left, the voltage/time diagram of a controlled voltage source in the middle, and the frequency/time diagram of the resulting frequency sweep on the right. In the case of such an ideal frequency characteristic of the voltage-controlled oscillator depending on its input voltage in the case of an also ideal behavior of the output voltage of the voltage source, there is no need for correction of the resulting frequency sweep.

FIG. 3b) on the left shows the realistic case of the voltage/frequency characteristic of a voltage-controlled oscillator, which is relatively highly non-linear. If the increase in such a voltage-controlled oscillator now takes place in accordance with the linear voltage/time curve shown in the middle in FIG. 3b, there results from this a non-linear frequency characteristic during a frequency sweep, shown on the right in FIG. 3b), with the reduced measurement accuracy connected with it.

FIG. 3c) now also shows the relatively highly non-linear curve of the voltage/frequency behavior of a real voltage-controlled oscillator on the left. The middle of FIG. 3c) shows how the voltage/time ratio of a voltage source controlled in accordance with the process invented appears, so that the desired linear frequency characteristic shown on the he right in FIG. 3c) results during a frequency sweep.

Finally, it should now be mentioned that the realization of the process in accordance with the invention shown in FIG. 2 with predominantly digital components is indeed advantageous, but not urgently necessary. Also, the division by divider 15 of the modulated high frequency signal of the voltage-controlled oscillator is already unnecessary now, or will be in the near future, in the case of the components fulfilling at present ever increasing speed requirements depending on frequency.

I claim:

1. A process for measuring the level of a liquid in a tank according to the radar principle, by means of a voltage-controlled oscillator having a frequency sweep with a duration and with a frequency fluctuation and determining the radar frequency and by means of a voltage source controlling the voltage-controlled oscillator, in the case of which the radar frequencies are modulated according to a Frequency Modulated Continuous Wave (FMCW) process through a corresponding control of the voltage source, where the frequency of the voltage-controlled oscillator is measured at least regularly during the frequency sweep to produced measured frequencies characterized by the fact that a non-linear frequency characteristic is corrected during the frequency sweep through a corresponding control of the voltage source.

2. A process in accordance with claim 1, characterized by the fact that the correction of the frequency characteristic of a frequency sweep is made by means of the measured frequencies of the current frequency sweep.

3. A process in accordance with claim 2, characterized by the fact that the duration of the frequency sweep in an interval is chosen to be inversely proportional to the variation of the level over time.

4. A process in accordance with claim 2 or 3, characterized by the fact that in the case of great variations of the level over time a status signal indicating said variations is emitted.

5. A process in accordance with claim 1, characterized by the fact that the correction of the frequency characteristic of a frequency sweep is made by means of the measured frequencies of a frequency characteristic or several averaged frequency characteristics of a previous frequency sweep.

6. A process in accordance with claim 5, characterized by the fact that the duration of the frequency sweep and the time interval between the frequency sweeps are held constant.

7. A process in accordance with claim 1, characterized by the fact that the correction of the frequency characteristic of a frequency sweep is made by means of the measured frequencies of the current frequency sweep and the measured frequencies of a frequency sweep or several averaged frequency characteristics of a previous frequency sweep.

8. A process in accordance with one of the claims 1 to 3 or 5 to 7, characterized by the fact that a control algorithm is used for the correction of a frequency characteristic of a frequency sweep.

9. A process in accordance with one of the claims 1 to 3 or 5 to 7, characterized by the fact that frequencies of the voltage-controlled oscillator are mixed in a mixer or divided in a divider before the measurement.

10. A process in accordance with one of the claims 1 to 3 or 5 to 7, characterized by the fact that said frequency fluctuation during a frequency sweep is controlled by means of the measured frequencies.

* * * * *